Sept. 30, 1958 A. SENKOWSKI ET AL 2,854,110
CLUTCH MECHANISM
Filed July 1, 1953 3 Sheets-Sheet 1

INVENTORS
Alexander Senkowski
Arthur E. Lynes
By Carlson, Pitzner, Hubbard & Wolfe
ATTORNEYS

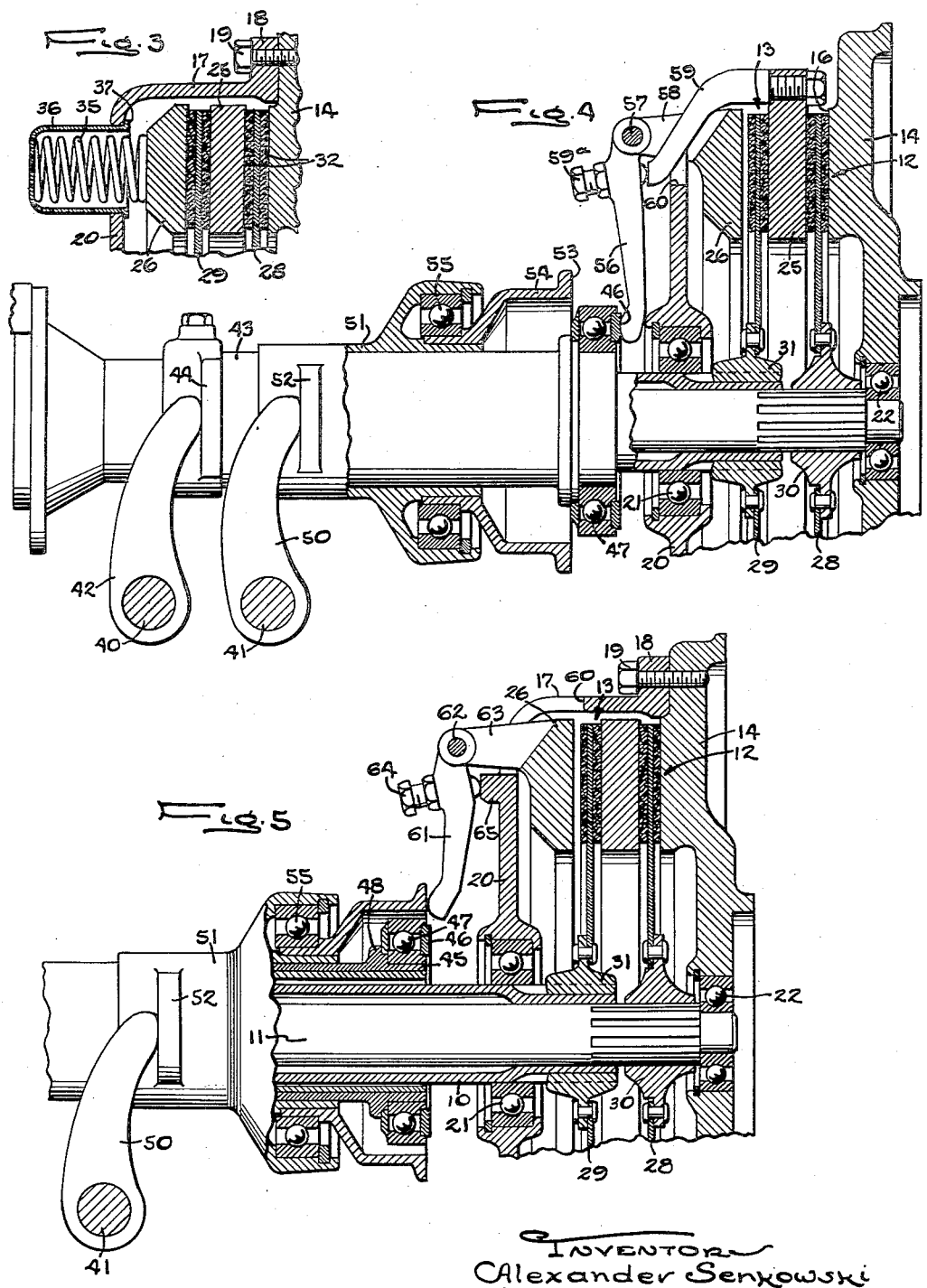

Sept. 30, 1958
A. SENKOWSKI ET AL
2,854,110
CLUTCH MECHANISM
Filed July 1, 1953
3 Sheets-Sheet 3
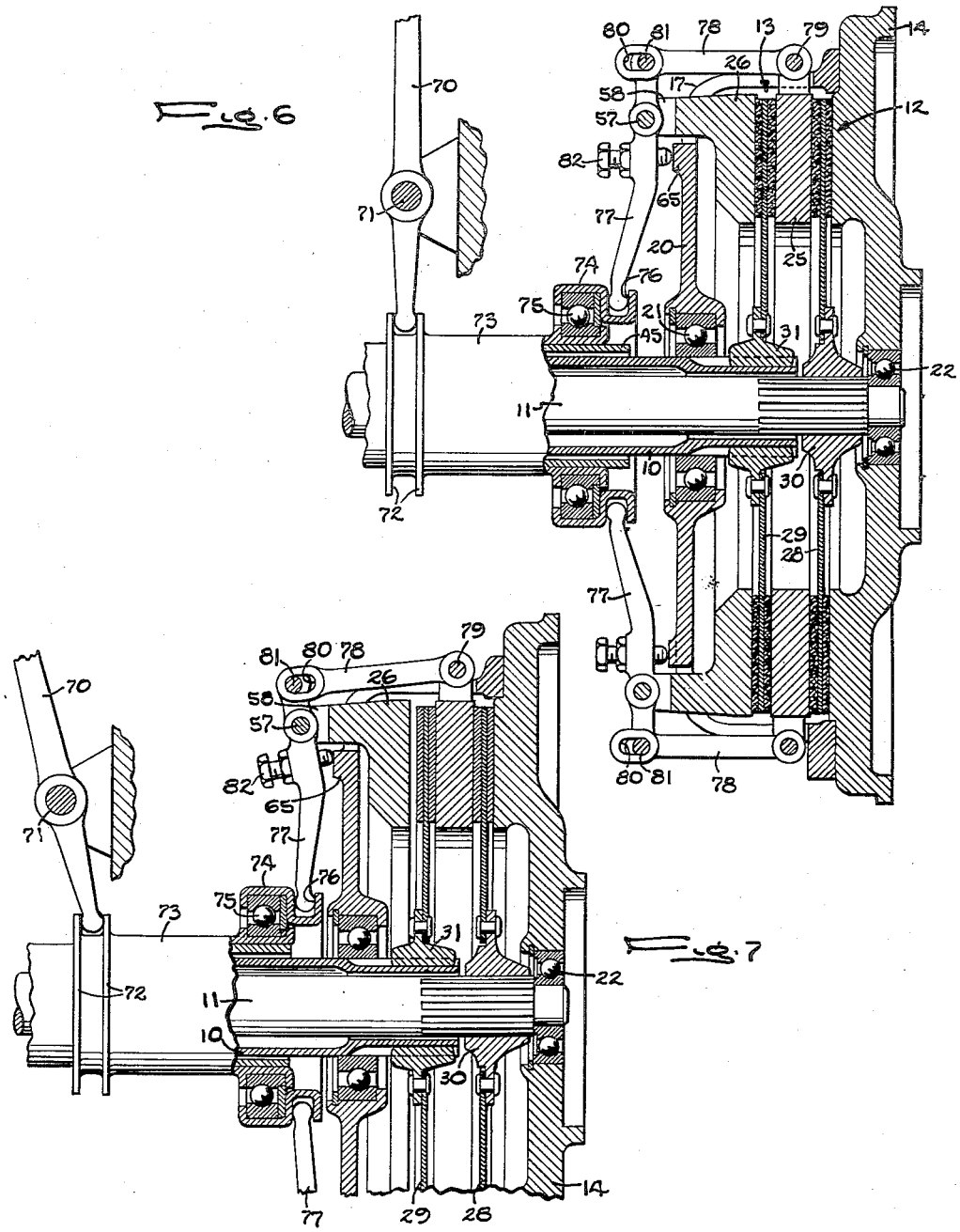
INVENTORS
Alexander Senkowski
Arthur E. Lynes
By Carlson, Pitzner, Hubbard & Wolfe
ATTORNEYS

United States Patent Office 2,854,110
Patented Sept. 30, 1958

2,854,110

CLUTCH MECHANISM

Alexander Senkowski, Earlsdon, Coventry, and Arthur E. Lynes, Coventry, England, assignors to Massey-Ferguson Limited, a British company Application July 1, 1953, Serial No. 365,466

Claims priority, application Great Britain July 2, 1952

6 Claims. (Cl. 192—48)

The invention relates to clutch mechanisms generally and more particularly to an improved clutch mechanism of the type adapted to independently control the motive power of a tractor or the like and a power take-off on the tractor.

One object of the invention is to provide a simple, compact clutch mechanism of the above general character which enables the tractor drive to be interrupted at will without interfering with the implement drive and which also enables both drives to be interrupted simultaneously in an emergency or when the tractor is standing idle.

Another object is to simplify and reduce the number of parts required in a dual clutch of the above type, to make it more rugged and dependable and to reduce its cost.

A more specific object is to provide a dual clutch mechanism utilizing a single set of springs for biasing both clutch elements to engaged position together with novel means for transferring the force of the springs to one of the clutches when the other is disengaged.

Other objects and advantages of the invention will become apparent from the following detailed description of the preferred embodiment illustrated in the accompanying drawings in which:

Figure 1 is a side view of a dual clutch and its actuating mechanism constructed in accordance with the invention, the clutch portion of the mechanism being sectioned in a plane taken on the line 1—1 of Fig. 2.

Fig. 2 is a view taken transversely of the driven shaft showing the clutch mechanism in end elevation.

Fig. 3 is a fragmentary sectional view taken in a plane substantially on the line 3—3 of Fig. 2, showing details of the biasing spring arrangement of the clutch.

Fig. 4 is a fragmentary sectional view of the clutch mechanism showing the front clutch engaged and the rear clutch disengaged.

Fig. 5 is a fragmentary sectional view of the clutch mechanism showing both the front and rear clutches disengaged.

Fig. 6 is a fragmentary sectional view of the clutch equipped with a modified form of actuating mechanism.

Fig. 7 is a fragmentary sectional view of the clutch and actuating mechanism shown in Fig. 6 with the front clutch engaged and the rear clutch disengaged.

While the invention has been shown and will be described herein as embodied in a preferred form of dual clutch mechanism, it is to be understood that this detailed disclosure is exemplary and is not intended to limit the invention. It is our intention to cover all modifications and alternative constructions falling within the spirit and scope of the invention as expressed in the appended claims.

The exemplary dual clutch mechanism shown in Figs. 1–5 of the drawings is particularly well adapted for use in tractors and comparable motor driven vehicles in which it is desired to provide a constantly running power take-off, that is, one driven independently of the change-speed transmission of the vehicle. In the embodiment illustrated, the vehicle drive is through a tubular shaft 10 extending to the input shaft of the change-speed transmission. The power take-off is driven from a shaft 11 coaxial with and extending through the tubular shaft 10. The latter shaft may have its forward end portion reduced in diameter internally to provide a bearing for the shaft 11.

The improved dual clutch mechanism provides two independent clutches, namely, a front clutch 12 and a rear clutch 13 for disengageably connecting the respective shafts 10 and 11 to a rotary driving member 14 which may conveniently comprise a flywheel mounted on an engine crankshaft in any preferred manner.

In accordance with the invention, the two clutches are associated with the flywheel in a manner which simplifies the construction of the parts of the assembly, reduces the number of parts required and in general provides a very rugged and dependable clutch mechanism. To this end, the flywheel 14 is constructed to provide on its rear face an annular flat driving surface 16 coaxial with the rotational axis of the wheel. Mounted on the rear face of the flywheel is a generally cup-shaped casing 17 having a peripheral flange 18 adapted to be secured to the marginal edge portion of the flywheel as by screws 19. The casing is formed with a flat transverse end portion 20 spaced from and disposed parallel to the driving surface of the flywheel. In the present instance the casing portion 20 is recessed to provide a seat for an anti-friction bearing unit 21 piloting the forward end of the shaft 10 while the forward end of the shaft 11 is piloted in an anti-friction bearing unit 22 seated in a recess in the flywheel 14.

The elements of the clutches 12 and 13 with the exception of the actuating mechanism are enclosed within the flywheel casing 17. This includes a pair of annular pressure plates, namely, a front plate 25 and a rear plate 26 supported coaxially with the flywheel. The plate 25 is formed with flat annular driving surfaces on both its front and rear faces while the plate 26 has a flat driving surface only on its front face. Interposed between the front pressure plate 25 and the flywheel 14 is a driven clutch element herein shown as a friction disc 28 non-rotatably mounted on the shaft 11. A second driven clutch element also shown as a friction disc 29 non-rotatably mounted on the shaft 10 is interposed between the pressure plates 26 and 25. The friction discs 28 and 29 as shown are annular in form and are riveted or otherwise rigidly secured respectively to hubs 30 and 31 splined on the shafts 11 and 10. Each disc is fitted with a pair of friction rings 32 riveted or otherwise rigidly attached to opposite sides of its marginal portion for coaction with the driving surfaces of the flywheel and pressure plates.

The improved clutch mechanism requires only a single set of actuating springs for biasing both clutches to engaged position. The spring set in its preferred form comprises a plurality of coiled compression springs 35 (Fig. 3) interposed between the transverse portion 20 of the casing 17 and the adjacent face of the rear pressure plate 26. The exemplary clutch employs twelve of the springs 35 but it will be understood that the number provided may be varied in accordance with the power to be transmitted through the mechanism. As shown in Fig. 2, the springs 35 are arranged in pairs uniformly spaced apart around the marginal edge portion of the casing 17. For convenience of assembly, each spring is enclosed in a cup-shaped retainer 36 adapted to be inserted through an aperture in the casing wall and having a flange 37 at its open end adapted to abut the inner wall of the casing to hold the retainer in place.

With the above arrangement the springs 35 normally apply pressure to the entire assembly or stack of pressure plates and friction discs and thus drivingly connect the driven clutch elements with the clutch driving member 14. It may be noted that both pressure plates 25 and 26 are constrained to rotate with the flywheel by reason of their relationship to the casing 17 as will appear presently.

Clutch actuating mechanism is provided for relieving one or both pressure plates of spring pressure to disengage one of the clutches or both of the clutches simultaneously. In the exemplary clutch mechanism pressure on the plate 26 is relieved to disengage the clutch 13 for the tractor transmission while maintaining spring pressure on the plate 25 to keep the power take-off clutch 12 engaged. This permits the tractor to be stopped or the drive to be interrupted for shifting gears without interfering with the functioning of the power take-off. Alternatively pressure on both plates may be relieved to disengage both of the clutches and thus stop the tractor and the power take-off mechanism when required.

The clutch actuating mechanism as shown in Figs. 1–5 of the drawings contemplates the use of two separate actuators which may comprise foot pedals or hand levers or a combination thereof. The actuators are respectively arranged to rock a pair of clutch throw-out shafts 40 and 41 supported in the tractor housing at the rear of the clutch mechanism. The shaft 40 has a rigidly mounted fork 42 straddling a sleeve 43 and coacting with abutments 44 projecting at opposite sides of the sleeve. As shown in Figs. 4 and 5, the sleeve 43 is supported for endwise sliding movement on a tubular bearing 45 coaxial with and surrounding the transmission drive shaft 10. At its forward end, the sleeve carries a thrust ring 46 supported by an anti-friction bearing unit 47 abutting a circumferential flange 48 on the sleeve.

Throw-out shaft 41 has a similar rigidly mounted fork 50 which straddles a sleeve 51 and coacts with abutments 52 projecting at opposite sides thereof. The sleeve 51 is mounted to slide axially on the sleeve 43 and carries at its forward end a thrust ring 53 of somewhat greater diameter than the thrust ring bearing 46. Thrust ring 53, as shown, is formed integrally with a collar 54 having a reduced end portion rotatably supported on the sleeve 51 by an anti-friction bearing unit 55.

The thrust rings 46 and 53 cooperate respectively with two sets of clutch throw-out levers to engage and disengage the clutches as above described. The inner clutch ring 46 is arranged in this instance for disengaging the rear clutch 13 while holding the front clutch 12 engaged. For this purpose it is arranged to coact with the inner ends of a series of clutch throw-out levers 56 each of which is pivotally mounted at its other end by a pin 57 between a pair of spaced lugs 58 rigid with and projecting rearwardly from the rear pressure plate 26.

The levers 56 are adapted to fulcrum on the ends of rigid arms 59 anchored to the front pressure plate 25 and extending rearwardly and inwardly therefrom between the lugs 58 so as to locate the fulcrum between the pivot pin and the inner end of the lever. To provide for adjustment of its throw, contact between each lever and its fulcrum is effected through the medium of a screw 59a threaded through the lever and having its inner end positioned for engagement with the end of the adjacent arm 59. It will be observed on reference to Figs. 1 and 2 of the drawings that the clutch casing 17 is formed with suitable openings or slots 60 for the accommodating of the lugs 58 and arms 59.

As shown in Fig. 2, the exemplary clutch is provided with a set of three of the throw-out levers 56 and these are spaced apart uniformly around the assembly. It will be evident that, with this arrangement, rocking of the levers 56 upon forward movement of the thrust ring 46 will pull the plate 26 rearwardly, relieving pressure from the driven clutch element 29 thereby disengaging the rear clutch. The force exerted by the clutch actuating springs 35 is now transferred through the levers 56 and through their fulcrums to the arms 59 and front pressure plate 25 to maintain pressure on the latter plate. The front clutch 12 is thus kept engaged to drive the power takeoff shaft while the tractor drive is interrupted.

The second set of throw-out levers comprises in this instance three throw-out levers 61 similar to the levers 56 and like them, pivotally mounted by pins 62 between spaced lugs 63 extending rearwardly from the rear pressure plate 26. Each lever has an adjustable fulcrum screw 64 which, in this instance, engages and fulcrums on a pad 65 formed on the rear portion 20 of the clutch casing 17. The levers 61 have their free ends positioned for engagement by the thrust ring 53 and accordingly when the ring is advanced, they act to pull the plate 26 rearwardly and transfer the pressure of the springs 25 to the clutch casing. Pressure is thus relieved on both pressure plates and consequently both clutches 12 and 13 are disengaged simultaneously.

The modified form of clutch actuating mechanism shown in Figs. 6 and 7 of the drawings has been illustrated in associating with a dual clutch similar to that above described with the two clutches 12 and 13 arranged to drive the concentric shafts 10 and 11. Thus, as shown, the clutch mechanism includes the two driven clutch elements or discs 28 and 29 respectively fixed to the shafts 11 and 10, and the two pressure plates 25 and 26 enclosed within the cup-shaped flywheel housing 17 mounted on the rear face of the flywheel 14. It will be understood that the stack of pressure plates and clutch discs are acted on by the springs 35 which tend to engage both clutches.

The modified actuating mechanism is designed for operation by a single operating member, herein shown as a lever 70 pivoted as at 71 on a stationary part of the vehicle and having its upper end positioned for convenient foot or hand manipulation. The lower end of the lever 70 engages between spaced circumferential flanges 72 on a sleeve 73 supported for endwise sliding movement on the guide sleeve 45 encircling the outer shaft 10. By rocking the lever 70 about its pivot the sleeve 73 may be shifted either forwardly or rearwardly from the central position in which it is shown in Fig. 6.

In the illustrated embodiment of the clutch actuating mechanism, the arrangement is such that both clutches 12 and 13 are engaged when the sleeve 73 is in its central position. When the lever 70 is pulled back, sleeve 73 is shifted forwardly to disengage both clutches. Conversely, when the lever is pushed forwardly, the sleeve 73 is moved back to retract the rear pressure plate 26 and disengage clutch 13 while transferring the biasing force of the springs 35 to the front pressure plate 25 to hold clutch 12 engaged.

For engaging and disengaging the clutches 12 and 13 in the above manner, the sleeve 73 is fitted at its forward end with a thrust ring 74 herein shown as secured to the sleeve by an anti-friction thrust bearing unit 75. The thrust ring 74 is formed to define a circumferential channel 76 adapted to receive the ball shaped inner ends of a series of throw-out levers 77. As in the case of the previously described clutch construction, the throw-out levers are pivotally secured by the pins 57 between the spaced lugs 58 extending rearwardly from the pressure plate 26.

At their outer ends, the throw-out levers 77 have a lost motion connection with the pressure plate 25 through links 78 each pivotally connected at one end by a pin 79 to the pressure plate and having a slot 80 at its other end for the reception of a pin 81 carried on the end of the associated lever. Each lever also has an adjusting fulcrum screw 82 located inwardly of its pivot 57 and adapted to engage the pad 65 on the flywheel casing.

In operation, a rearward pull on the inner ends of the throw-out levers 77 will result in the retraction of the pressure plate 26 through the connections provided by the pins 57. Clutch 13 is thus disengaged. In such movements of the levers, the fulcrums are on the pins 81 which engage the forward ends of the slots 80 in the links 78. The force exerted by the springs 35 is thus transferred through the levers 77, pins 81 and links 78 to the front pressure plate 25 to hold the clutch 12 engaged.

When the inner ends of the levers are rocked forwardly to the positions shown in Fig. 7, the levers fulcrum on the screws 82 and pads 65 again retracting the rear pressure plate 26 to disengage the clutch 13. Due to the lost motion connections provided by the pins 81 and slots 80 with the links 78, the pressure plate 25 is not positively retracted. However, that plate is relieved of spring pressure which is transferred to the clutch casing and accordingly, the clutch 12 is likewise disengaged. It will be evident that both clutches may be engaged simultaneously by restoring the lever 70 to its central position.

It will be evident from the foregoing that the invention provides a dual clutch mechanism of novel and advantageous construction particularly well suited for use in tractors and comparable motor driven vehicles. The improved clutch mechanism is characterized by its simplicity and by the relatively small number of parts required. This simplicity reduces manufacturing cost and contributes substantially to the ruggedness and dependability of the clutch. In this connection it is important to note the novel combination and relationship of the clutch elements and the actuating mechanisms which permits the use of a single set of springs for biasing both clutches to engaged position.

We claim:

1. In a clutch mechanism, in combination, a rotary driving member presenting an annular friction driving surface on one face, a casing rigid with said member including a transverse portion spaced from and disposed generally parallel to said friction surface, a pair of annular pressure plates supported in said casing for movement toward and from said member, a tubular shaft extending into said casing and rotatably supported on the transverse wall portion of the casing, a second shaft extending through said tubular shaft and having its end portion rotatably supported in said member, a clutch disc non-rotatably mounted on said tubular shaft and having its marginal portion interposed between said two pressure plates, a second clutch disc non-rotatably mounted on said second shaft and having its marginal portion interposed between the friction surface on said member and the adjacent pressure plate, spring means interposed between the transverse portion of said casing and the pressure plate adjacent thereto normally urging both pressure plates in a direction to drivingly engage both clutch discs, a first set of levers fulcrumed on said transverse wall portion of the casing operative to retract one of said pressure plates and relieve the spring pressure on both clutch discs, and a second set of levers fulcrumed on the other of said pressure plates operative to retract said one pressure plate while maintaining pressure on the front pressure plate whereby to disengage the drive only for the clutch disc interposed between the two pressure plates.

2. In a clutch mechanism, in combination, a rotary driving member presenting an annular friction driving surface on one face, a casing rigid with said member including a transverse portion spaced from and disposed generally parallel to said friction surface, a pair of annular pressure plates supported in said casing for movement toward and from said member, a rotatably supported tubular shaft having one end extending into said casing, a second shaft extending through said tubular shaft and having its end portion projecting beyond the end of the tubular shaft, a clutch disc non-rotatably mounted on said tubular shaft and having its marginal portion interposed between said two pressure plates, a second clutch disc non-rotatably mounted on the projecting end of said second shaft and having its marginal portion interposed between the friction surface on said member and the adjacent pressure plate, spring means interposed between the transverse portion of said casing and the pressure plate adjacent thereto normally urging both pressure plates in a direction to drivingly engage both clutch discs, a first set of throw-out levers pivotally connected to the rear pressure plate and adapted to fulcrum on said casing to retract the plate and transfer the force of said springs to the casing whereby to disengage both clutch discs, and a second set of throw-out levers pivotally connected to the rear clutch plate and adapted to fulcrum on the front clutch plate to retract the rear plate and transfer the force of said springs to the front plate whereby to disengage the rear clutch disc while maintaining the front clutch disc engaged.

3. In a dual clutch mechanism, in combination, a driving member, a pair of coaxially disposed shafts supported in axial alinement with said member, a pair of friction clutches operative when engaged to drivingly connect said member to the respective shafts, a single set of springs urging both clutches to engaged position, a first throw-out mechanism operable to relieve the spring pressure and disengage both clutches, and a second throw-out mechanism operable to relieve the spring pressure on one clutch to disengage the same while maintaining spring pressure on the other clutch to keep it engaged.

4. In a dual clutch mechanism, in combination, a driving member, a pair of coaxially disposed shafts supported in axial alinement with said member, a pair of friction clutches operative when engaged to drivingly connect said member to the respective shafts, a single set of springs urging both clutches to engaged position, clutch throw-out means including a member movable axially of said shafts in opposite directions from a central position, mechanism actuated by said throw-out member upon movement in one direction for relieving the spring pressure on both clutches to disengage them, and mechanism actuated by said throw-out member upon movement in the opposite direction for relieving the spring pressure on one of the clutches to disengage it while maintaining spring pressure on the other clutch to keep it engaged.

5. In a dual clutch, in combination, a rotatable driving member presenting a friction driving surface on one face, a pair of driven clutch elements supported coaxially of said member on the same side as said driving surface, a first pressure plate interposed between said driven clutch elements and operative to press one of the elements into frictional driving engagement with the driving surface of said member, said first pressure plate also presenting a friction driving surface for coaction with the other of said driven elements, a second pressure plate operative to press said other element into frictional driving engagement with the driving surface of said first pressure plate, spring means engageable with said second pressure plate operative to apply pressure to both pressure plates to maintain the driven clutch elements engaged, means operable to retract said second pressure plate and release both driven elements from engagement with their associated driving surfaces, and other means operable to retract said second pressure plate and transfer the spring pressure to said first pressure plate so as to maintain it in engagement with the associated driven element.

6. In a dual clutch mechanism, in combination, a rotatable driving member, a pair of coaxially disposed shafts supported in axial alinement with said member, a pair of pressure plates mounted coaxially with said driving member for movement axially toward and from one face of the member, a first friction member fixed to the inner of said shafts and extending between said one face of the driving member and the adjacent pressure plate, a second friction member fixed to the outer of said shafts and extending between the two pressure plates, spring means acting directly on the pressure plate remote from said member and through said second friction member on said other pressure plate to drivingly engage both friction members, and actuating means including a member shiftable axially of said shafts to transfer the spring pressure from said remote pressure plate to the other pressure plate independently of said second friction member so as to interrupt the drive for that member while maintaining the drive for said first friction member.

References Cited in the file of this patent

UNITED STATES PATENTS

| | | |
|---|---|---|
| 1,931,241 | Tibbetts | Oct. 17, 1933 |

FOREIGN PATENTS

| | | |
|---|---|---|
| 460,770 | Great Britain | Jan. 29, 1937 |
| 460,828 | Great Britain | Jan. 29, 1937 |
| 635,042 | Great Britain | Mar. 29, 1950 |
| 1,011,804 | France | June 27, 1952 |